United States Patent

[11] 3,588,318

| [72] | Inventor | George E. Ollis<br>Worcester, Mass. |
|---|---|---|
| [21] | Appl. No. | 883,724 |
| [22] | Filed | Dec. 10, 1969 |
| [45] | Patented | June 28, 1971 |
| [73] | Assignee | United States Steel Corporation |

[54] NETWORK CABLE
11 Claims, 1 Drawing Fig.

[52] U.S. Cl. .................................................... 174/121,
174/110
[51] Int. Cl. ...................................................... H01b 7/02
[50] Field of Search .......................................... 174/110.3,
121, 121.3, 121.4; 117/231

[56] References Cited
UNITED STATES PATENTS
3,425,865  9/1970  Shelton ......................... 174/121X OTHER REFERENCES
Nizinski et al. Silicone Rubber Graded Construction for High Voltage Insulation in Wire May 1962, pp. 628, 633, 634 and 677

*Primary Examiner*—E. A. Goldberg
*Attorney*—Rea C. Helm

ABSTRACT: A heat and moisture resistant network cable has a barrier tape over a nickel plated copper conductor. A heat and moisture resistant silicone insulation covers the barrier tape. Three layers of flexible silicone tape are bonded over the insulation with moisture resistant adhesive.

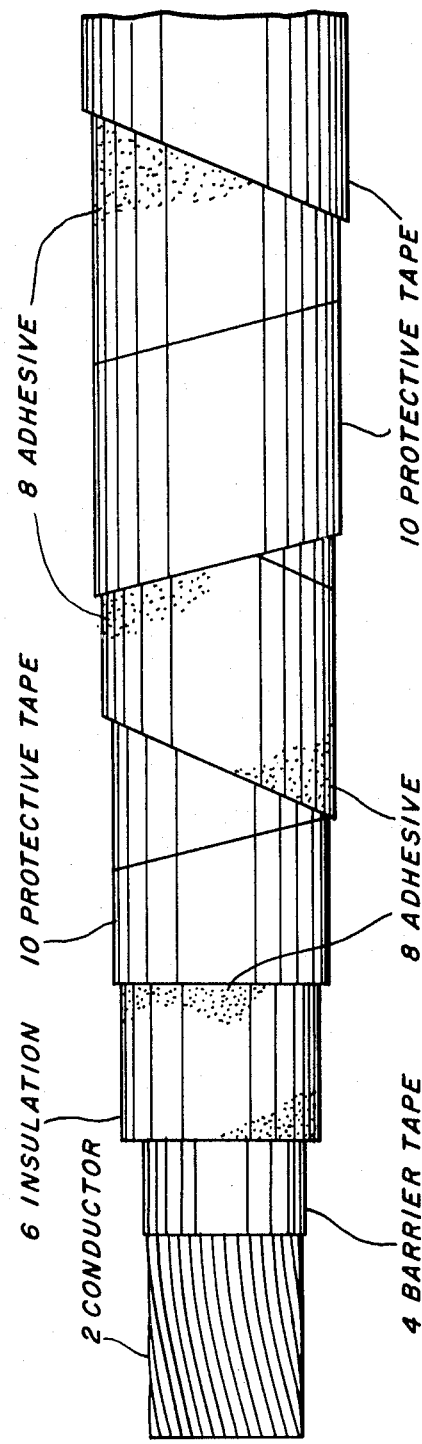

NETWORK CABLE

This invention relates to insulated power cables used in power distribution systems and particularly to such cables used in underground conduits that are capable of operating at high temperatures.

Prolonged overloading of network cables in areas served by underground distribution systems has become a serious problem in large metropolitan areas. The increase in current demands during peak period causes electric transmission failures. The current demand during an overload period will heat conductors as high as 300° C. The conventional network cable, which consists of a heavy metal conductor, usually 1" or more in diameter, with 125 to 250 mils of butyl rubber insulation and a neoprene jacket, cannot withstand these high temperatures for more than a brief period. These cables are usually rated for 125° C, operating temperature. The problem is further aggravated by the fact that many underground conduits are already filled to capacity with network cables.

According to my invention, the individual copper wires which are part of a stranded conductor of a network cable are first coated with nickel. A thin barrier tape is then wrapped around the bare conductor. A moisture and heat resistant silicone rubber insulation is extruded over the wrapped conductor and then cured. Several layers of glass impregnated heat resistant silicone rubber tapes are wrapped and bonded over the insulated conductors and cured. This cable is flame resistant and is capable of withstanding temperatures as high as 350° C. for 4 or 5 hours and can operate continuously at temperatures as high as 200° C. In the event of extreme temperatures which may deteriorate the silicone rubber, the fiberglass in the tape provides some mechanical support to the conductor. The cable also has the necessary moisture and abrasion resistant characteristics for installation in ducts which may be damp or wet. Use of such a cable will eliminate or substantially reduce the use of current limiters in underground network systems.

It is, therefore, an object of my invention to provide a network cable capable of operating at high temperatures and withstanding high peak overloads.

Another object of my invention is to provide such a cable that is moisture, flame and abrasion resistant.

Still another object is to provide such a cable that includes mechanical support for the conductor when the cable is subject to insulation destructive temperatures.

These and other objects will become more apparent after referring to the following drawing and specification, in which:

The single FIGURE is an elevational view of the network cable with successive layers cut away to show the structure.

Referring now to the drawing, reference numeral 2 represents a stranded copper conductor with each individual wire being nickel clad or coated to prevent oxidation of the copper conductors. An adequate thickness of nickel may vary from about 0.0005 inch on wire 0.0745 inch in diameter to about 0.005 inch on wire 0.128 inch in diameter or larger. The nickel coating not only protects the copper from oxidation at the high operative temperature but also protects the copper from the adverse effect of the curing agent in the insulation as will be later described.

A barrier tape 4 is wrapped in overlapping relationship over conductor 2 either helically or longitudinally. The tape thickness may vary from about 0.005 inch for conductors about 0.375 inch in diameter to about 0.007 inch for conductors about 1.125 inch in diameter. The layer of tape 4 serves to prevent gases and decomposition products of the curing agent of the insulation from reacting with the metal of the conductor and also serves to prevent the extruded insulation from penetrating between the wires of the stranded conductor. Without such a barrier, the insulation could penetrate into the second layer of wires in conductor 2.

The barrier tape 4 must be made of material that is chemically resistant to the insulation and its curing agent, but tough enough to hold the insulation during extrusion, be flame resistant, heat resistant and flexible enough to be wrapped around the conductor and maintain flexibility at high temperatures. The tape preferably should also be moisture resistant.

There are various tapes available that meet the above requirements and in addition have good electrical insulating properties. While the electrical insulating properties are not necessary, it is nevertheless desirable to use such materials because of the potential insulating characteristics at temperature extremes as will be later described. Suitable tapes may be made of synthetic resinous materials such as polyamides and fluorocarbon polymers such as polytetrafluoroethylene, fluorinated ethylene-propylene, polychlorotrifluoroethylene and polyvinyledine fluoride.

The efficiency of barrier tape 4 may be improved by sealing to provide a vapor proof barrier. For example, polyamide tape having an adhesive backing can be used, or a polyamide tape laminated to a fluorinated ethylene-propylene can be sealed by fusing the fluorinated ethylene-propylene layer at 600° F. to 650° F. for a few seconds. Fluorinated ethylene-propylene and polychlorotrifluoroethylene tapes may be sealed by fusing, and polytetrafluoroethylene can be sealed by sintering. Tapes can be coated with a pressure sensitive silicone adhesive. In the event that moisture entrapped in the conductor is vaporized to steam, the sealing of the barrier tape will help prevent reversion of the insulation.

An insulating layer 6 of high temperature resistant silicone rubber is extruded or otherwise molded over the tape 4. Insulation thickness will vary in relation to conductor size and may be five sixty-fourths inch thick on conductor sizes 1 to 4/0 AWG to seven sixty-fourths inch on conductor sizes from 525,000 circular mils to 1,000,000 circular mils for 600 volt service. Insulation 6 is preferably a compound containing essentially the following components: poly methyl vinyl organopolysiloxane from 75 percent to 85 percent by weight; surface treated fumed silica from 18 percent to 28 percent; a curing agent such as benzoyl peroxide, or 2-4, dichlorobenzoyl peroxide, or tertiary butyl peroxy isopropyl carbonate, or ditertiary butyl peroxide from about 0.5 percent to 2.0 percent based on 100 percent activity; and a water resistant catalyst ditertiary butyl peroxide or dimethyl 2,5 di(t-butyl peroxy) hexane from about 0.5 percent to 1.5 percent.

Insulation layer 6 is then cured at a temperature between 125° C. to 220° C., preferably in a continuous vulcanizer. Since there is usually an excess of catalyst, peroxides and acidic residues from the catalyst usually will remain in the rubber after curing. When the cable is heated to temperatures over about 260° C., these residual peroxides and acids become volatile and without tape barrier 4 will adversely react with the metal conductors.

The ditertiary butyl peroxide, the 2,5, dimethyl 2,5 di(t-butyl peroxy) hexane and the surface treated fumed silica in insulation 6 serves to make the silicone rubber more moisture resistant as compared to conventional silicone rubber compound. Most of the residuals from the catalyst volatilize out, and the remainder is not soluble in water nor attracted to water. The surface treated fumed silica tends to disperse and thus fortify the moisture resistance of the compound.

This compound is more resistant to heat than conventional silicone rubber compounds because it is essentially a silicone gum with only enough treated silicon dioxide filler incorporated to render it extrudable in conventional equipment. As a result of the high gum-low specialized filler ratio the compound does not embrittle and retains approximately 70 percent of its original elongation when exposed to temperatures of 400° F. for 60 days where clay, talc or calcium carbonate filled silicones become hard and retain only about 30 percent of their original elongation when so heated.

The cable is then coated with a silicone resin adhesive 8. Such an adhesive may be a blend of a methyl phenyl resin polymer with dimethylpolysiloxane or methylphenylpolysiloxane gum dissolved in a 50 percent to 60 percent solution of mineral spirits such as toluene, xylene, or naphtha or another solvent which dissolves the polymer and is volatile enough for rapid evaporation. It is catalyzed by the addition of 2,4 dichlorobenzoyl peroxide (1—3 percent) or by benzoyl peroxide (1—3 percent). This catalyst helps the moisture resistant qualities of the cable because the residuals become volatilized when the catalyst causes the cross linking of the blend of silicone gum and resin.

Over the adhesive coated cable is then applied several wraps of fiberglass cloth tape 10, impregnated with a silicone rubber compound such as a dimethylpolysiloxane or a methyl vinyl polysiloxane gum about 49 percent by weight; reinforcing fillers such as fine particle size silica, diatomaceous earth or calcined kaolin clay about 45 percent to 49 percent, a heat-aging stabilizer such as calcined red ferric oxide from which the water of crystallization has been removed from about 1 percent to 1.5 percent and a curing agent such as benzoyl peroxide from about 1 percent to 2 percent. This compound is selected for its flexibility, not its moisture resistance, since the adhesive and insulation provide adequate moisture resistance. However, moisture resistance could be improved, at the expense of flexibility, by the use of a high proportion of fine particle fumed silica and a reduced amount of diatomaceous earth or calcined kaolin clay. The tape is prepared by impregnating the fiberglass cloth tape with a 15 percent to 20 percent solution of silicone rubber in xylene or toluene or other suitable solvent in such a manner that the surfaces of the glass yarn and the interstices of the glass yarn are covered, permeated and impregnated with a continuous coating of silicone rubber. The tape is then heated at a temperature range of 150° F. to 300° F. for 5 to 10 minutes. This partially cures the tape so that it may be spirally wrapped. In this degree of cure, the silicone rubber bonds to the glass in a state where it no longer has a tacky finish so that it can be put up in rolls without adjacent layers adhering to each other. However, the cross linking of the polymer chain has not progressed to the degree that further cure is prevented. Interliners could be used which would not require the partial cure.

Several layers of tape, preferably three, are applied, preferably without lap, with each layer wrapped helically at about an angle of 50° to 60° in the opposite direction to the preceding layer. Adhesive 8 is applied between successive layers of tape.

The cable is then cured by heating in an oven or by inpingement of hot air at about 350° F for 3 to 4 hours. This optimizes the physical properties of insulation 6 by increasing the hardness and stabilizing the tensile strength and elongation against radical change in service at elevated temperatures and drives off from the insulation as much as possible of the unreacted peroxides, residual products such as benzoic acid and low polymer volatiles. This also bonds the insulating layer and the protective tape layer providing a homogeneous mass. These compounds are also flame resistant and the glass fibers improve the abrasion resistant qualities of the jacket compound, particularly during cable installation.

When the completed cable is subject to temperatures towards the upper limit, the conductor will expand because of the expansion of the individual wires. Barrier tape 4 will expand also and insulation 6 will also tend to swell. Tape layers 10 also have expansion characteristics but the glass fiber cloth will tend to hold the cable together during expansion. All of the components of the cable have a thermoplastic memory and will return to their former dimensions on cooling to lower operating temperatures.

In the event the cable is subjected to temperatures high enough to destroy the insulation, the cable will retain some of its insulating capacity by virtue of the insulating residue being held in place by the multiple layers of fiberglass tape and the insulating properties of the barrier tape.

Other materials such as asbestos, mica, quartz, polyester glass, and a high temperature polyamide may be used in place of fiberglass in the tape. Tapes with warp and woof of different materials, such as a polyester glass and a polyamide are also useful for increased flexibility.

While one embodiment of my invention has been shown and described, it is obvious that other modifications and adaptations may be made.

I claim:

1. A heat and moisture resistant electrical network cable comprising a central metallic conductor and an insulating layer of silicone rubber surrounding said conductor, said insulation being essentially poly methyl vinyl organopolysiloxane, surface treated fumed silica, a curing agent selected from the group consisting of benzoyl peroxide, 2–4, dichlorobenzoyl peroxide, and tertiary butyl peroxy isopropyl carbonate, and a water resistant catalyst selected from the group consisting of ditertiary butyl peroxide and dimethyl 2,5 di(t-butyl peroxy) hexane.

2. A cable according to claim 1 in which the conductor is stranded nickel clad copper wires.

3. A cable according to claim 2 which includes a barrier tape wrapped and lapped over the bare conductor.

4. A cable according to claim 3 in which said barrier tape is selected from the group consisting of polyamide, polytetrafluoroethylene, fluorinated ethylene-propylene, polychlorotrifluoroethylene, and polyvinyledine fluoride.

5. A cable according to claim 4 in which the barrier tape is sealed against vapor penetration.

6. A cable according to claim 5 including a protective tape helically wrapped around said insulation.

7. A cable according to claim 6 in which said tape comprises a fibrous weave, a silicone rubber compound impregnating said weave, said compound including a silicone rubber selected from the group consisting of dimethylpolysiloxane and methyl vinyl polysiloxane gum; fillers selected from the group consisting of fine particle size silica, diatomaceous earth, calcined kaolin clay, and calcined red ferric oxide from which the water of crystallization has been removed; and benzoyl peroxide.

8. A cable according to claim 7 in which the warp and the woof of said weave are each selected from the group consisting of glass, asbestos, mica, quartz, polyester glass, and a high temperature polyamide.

9. A cable according to claim 8 including at least two layers of said protective tape each helically wrapped in abutting relation with itself and wrapped in opposite directions from the adjacent layer.

10. A cable according to claim 9 including an adhesive layer between the insulation and the layer of protective tape adjacent the insulation and an adhesive layer between adjacent layers of protective tape.

11. A cable according to claim 10 in which the adhesive is a blend of a methyl phenyl resin polymer and one of the group consisting of dimethylpolysiloxane and methylphenyl-polysiloxane gum, said blend being dissolved in a solution having from about 50 percent to about 60 percent by weight of a solvent of the group consisting of mineral spirits, toluene, xylene and naphtha, and a catalyst of the group consisting of 2,4 dichlorobenzoyl peroxide and benzoyl peroxide.